Figure 1:
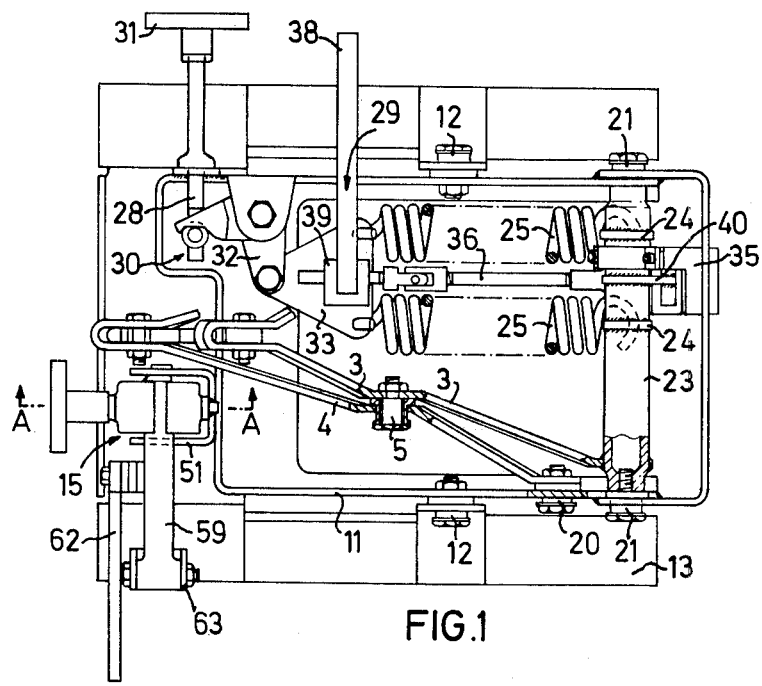

United States Patent [19]

Rönnhult et al.

[11] 4,195,883
[45] Apr. 1, 1980

[54] ARRANGEMENT FOR DAMPING OSCILLATING MOVEMENTS IN VEHICLE SEATS

[75] Inventors: John F. Rönnhult; Bjarne L. Petersen; Staffan S. Sjöström, all of Södertälje, Sweden

[73] Assignee: Saab-Scania Aktiebolag, Södertälje, Sweden

[21] Appl. No.: 871,619

[22] Filed: Jan. 23, 1978

[30] Foreign Application Priority Data

Jan. 24, 1977 [SE] Sweden .................. 7700689

[51] Int. Cl.² .................................... A47C 3/00
[52] U.S. Cl. ........................... 297/302; 248/564; 248/588
[58] Field of Search ............ 248/399, 400; 297/302, 297/304, 307, 308, 311, 345, 346

[56] References Cited

U.S. PATENT DOCUMENTS

| | | | |
|---|---|---|---|
| 1,178,488 | 4/1916 | Bolens | 248/378 |
| 1,875,500 | 9/1932 | Roeder | 297/302 X |
| 2,339,953 | 1/1944 | Schlorman | 248/382 |
| 2,567,346 | 9/1951 | Petermeier | 248/377 |
| 3,774,963 | 11/1973 | Lowe | 297/307 X |
| 3,826,457 | 7/1974 | Longchamp | 248/399 |
| 3,888,451 | 6/1975 | Lacey | 248/399 |
| 3,984,078 | 10/1976 | Sturhan | 248/399 |

FOREIGN PATENT DOCUMENTS

| | | |
|---|---|---|
| 2213750 | 9/1973 | Fed. Rep. of Germany . |
| 1146585 | 11/1957 | France . |
| 2165687 | 8/1973 | France . |
| 2166951 | 8/1973 | France . |
| 366505 | 4/1974 | Sweden . |

*Primary Examiner*—James C. Mitchell
*Attorney, Agent, or Firm*—Cushman, Darby & Cushman

[57] ABSTRACT

A vehicle seat is carried on a frame which is pivotably mounted on a base frame that is secured to the vehicle floor. The seat can pivot around an axis that is essentially horizontal and transverse to the vehicle direction of travel. There is provided at least one damping element for damping pivotations around said axis. In this way disturbing thrusts transferred to the back of a person via the back support portion of the seat are eliminated.

5 Claims, 4 Drawing Figures

ARRANGEMENT FOR DAMPING OSCILLATING MOVEMENTS IN VEHICLE SEATS

The present invention relates to an arrangement for damping oscillating movements in vehicle seats comprising a seat portion, a back support portion, a frame and a base frame, the frame being located between at least the seat portion and the base frame and comprising pivotable arms and spring elements, allowing the seat portion to be positioned at different levels relative to the base frame, depending on the load.

In driving seats for utility vehicles, such as trucks and buses, it is common practice to provide the seat frame with devices for resilient absorption of vertical oscillations. Such seats do, however, not have sufficiently comfortable characteristics when a vehicle in certain operating conditions is subjected to oscillations which give rise to substantially horizontal disturbing forces on the seat. These oscillations are the result of unevennesses in the road surface and they are propagated via the vehicle wheels and suspension to the carrying portions of the vehicle. This transmission is especially noticeable in the cases where a frame structure constitutes the carrying portions of the vehicle, which is often the case with trucks. The wavelength of the oscillations is mainly determined by the wheelbase of the vehicle, and as a rule the frequency of the oscillations is only a few Hz. Trucks with short wheelbases are especially subjected to such oscillations, and in particular so-called "mechanical horses" or prime movers for semi-trailers. In the latter case the vehicle combination and the distances between the axles tend to amplify the oscillations. These are propagated to the driving cabin, and disturbing forces with horizontal force components act on the cabin and thereby the seats in the cabin. Such disturbing forces are transferred to a person sitting in a seat, especially via the back support portion of the seat, the person in question being subjected to uncomfortable thrusts in the back.

The object of the present invention is to eliminate said drawbacks.

The invention relates to an arrangement for damping oscillating movements in vehicle seats comprising a seat portion, a back support portion, a frame and a base frame, the frame being located between at least the portion and the base frame and comprising pivotable arms and spring elements allowing the seat portion to be positioned at different levels relative to the base frame, depending on the load, the base frame being connected to the vehicle floor or to rails fixed thereto for horizontal translation of the vehicle seat. The arrangement according to the invention is essentially characterized in that the lower ends of the arms are pivotably supported in a support frame or similar support means that constitutes the lower part of the spring-equipped frame, and in that the support frame is pivotably supported by the base frame, so that the seat frame, the seat portion and the back support portion can oscillate about an essentially transverse axis, and in that there is provided at least one damping element for damping such oscillations.

A vehicle seat equipped with the arrangement according to the invention can thus carry out dampened curtseying movements so that the back support portion of the seat is given substantially horizontal oscillating movements. The result of this is that when horizontal disturbing forces consequential to the above-described oscillations in the carrying parts of the vehicle are propagated to the seat, the arrangement according to the invention reduces transference of the disturbing forces to a person sitting in the chair by means of resilient springing.

In an advantageous embodiment of the invention, the mounting of a support frame in the base frame is situated in or adjacent to a common center of gravity plane for the seat and a person sitting on the seat. Easily controllable curtseying movements are obtained in a simple manner by such placing of the oscillation axis, since the dampening element which is to dampen said oscillating movement does not need to take up any notable gravitational force.

The arrangement according to the invention can be modified in alternative embodiments, and an extremely simple variation enables it to be attached to seats already used in vehicles, without any great interference in the construction of the existing seat.

Other distinguishing features of the invention are apparent from the following claims and may also be read from the description below, which describes in detail two embodiments exemplifying the invention while referring to the attached drawings.

Figure 2:
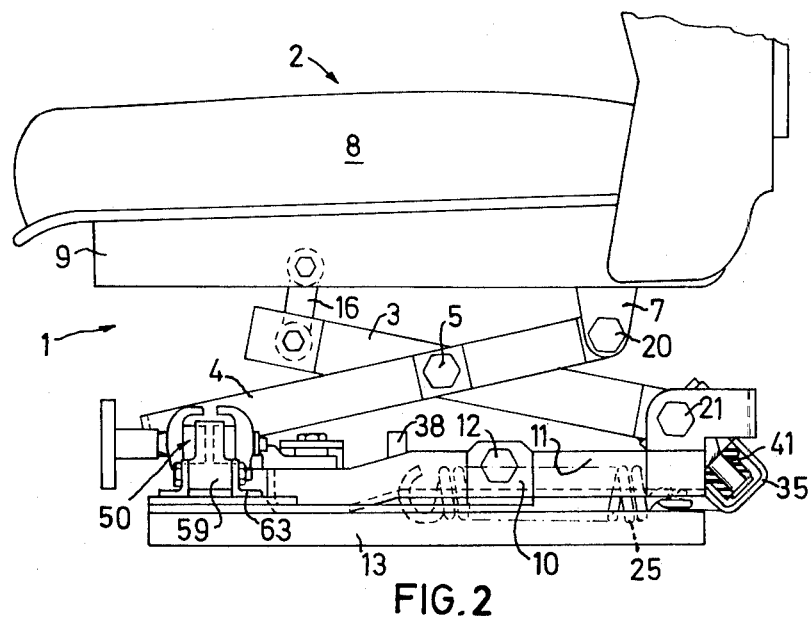
Figure 3:
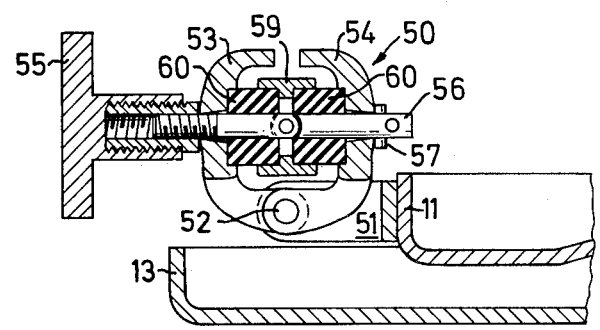
Figure 4:
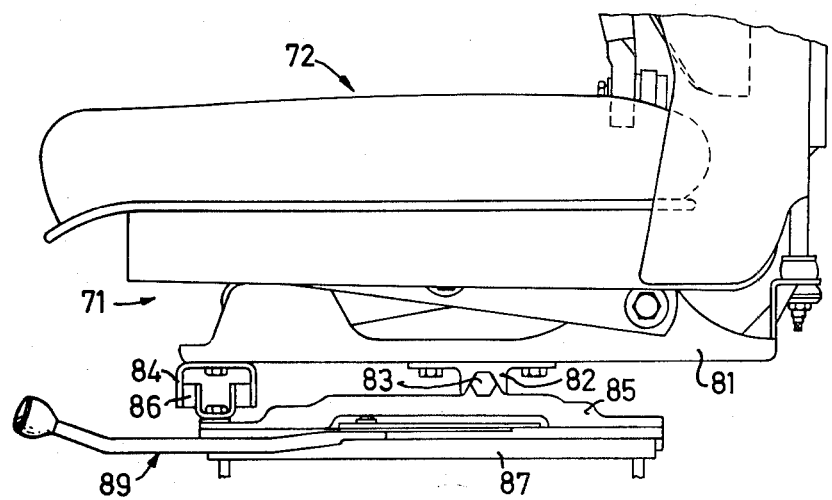

In the drawings,

FIG. 1 shows a view from above of an arrangement according to the invention integrated in a frame to a vehicle seat, FIG. 2 shows a side view of the seat frame according to FIG. 1, FIG. 3 shows to an enlarged scale a cross section A—A according to FIG. 1, and FIG. 4 shows a side view of a modified arrangement according to the invention, formed as an accessory to commonly available vehicle seats.

According to the arrangement in FIGS. 1 and 2, a mounting arrangement for vehicle seats has the following principle design. A frame 1 of a vehicle seat 2 includes two arms 3,4 crossing each other in vertical planes, these arms being at their crossover points pivotably mounted relative to each other by means of two pin bearings 5 to form a scissors structure. The respective upper ends of the arms 3,4 are pivotably connected to the seat portion 8 of the chair, and the respective lower ends of the arms 3,4 are pivotably connected to a lower support frame 11. Said support frame 11 has a generally rectangular shape and is pivotably mounted relative to a base frame 13, in that on either side of the seat there is a bracket 10 which is attached to the base frame 13 and carries a pin bearing 12 for the support frame 11, thereby enabling oscillation of the support frame 11 about a substantially horizontal axis which is also transverse relative to the forward direction of the seat 2. Between the support frame 11 and the base frame 13 there is arranged a damping means 15, intended to dampen said oscillating movements about the pin bearings 12. The base frame 13 is rigidly mounted vertically in relation to a floor plate or to another suitable portion of the vehicle body (not shown), e.g. the flooring in a truck cabin. Said positional fixing is achieved by longitudinally guiding the base frame 13 in conventional runners (not shown) attached to the flooring, or with the aid of other known vertical connecting means between the base frame 13 and the floor plate.

In previously known seat frames with a scissors construction, the movable mountings of the arms to the seat portion and to the frame supporting means are usually provided by rollers carried in U-shaped runners fastened to the seat portion and the supporting means, said mountings generally causing considerable friction losses. In the exemplified mounting arrangement, the two pivotable arms 3,4 in the frame 1 are formed substantially as isosceles triangles, which is partly apparent from FIG. 1. The respective triangle apices of the arms face the forward direction of the seat, one arm 3 being pivotably connected to a frame 9 for the seating portion 8 of the seat by a relatively short link 16 and two mountings, while the forward end of the other arm 4 is pivotably connected to the lower supporting frame 11 by means of a bearing. The rear ends of the arm 4 are pivotably carried by means of pin bearings 20 in brackets 7 fixed to the seat frame 9, and the rear ends of the arm 3 are fastened to the ends of a tubular shaft 23 which is pivotably mounted between the longitudinal sides of the support frame 11 with the aid of two shaft bearings 21. Said pivotable bearings give smaller friction losses than known roller bearings, and this constitutes a great advantage, since friction losses should be avoided as far as possible for obtaining pliable curtseying movements of the seat.

The shaft 23 consequently constitutes a base for the triangular-shaped arm 3, and on the shaft 23 there are fixed a pair of levers 24 which are the attachments for two springs 25 arranged side by side. The other ends of the springs 25 are attached to a yoke 33 which is part of a height adjustment mechanism 30. The springs 25 have the task of regulating the vertical springing function of the seat 2, and the length of the springs, i.e. their pretensioning, can be varied to give a suitable height to the seat. The adjustment of spring lengths takes place by the hand-operated height adjusting mechanism 30. This comprises a handwheel 31 operable from one side of the seat, and when turned it axially displaces a shaft 28 thereby causing an angled lever 32 to turn. The angled lever 32 is pivotably jointed to the yoke 33 and when the angled lever 32 is turned, the yoke is moved longitudinally thus altering the tension in the springs 25.

The adjusting mechanism 30 coacts with a locking mechanism 29. The latter comprises a U-shaped bearing bracket 39 transversely mounted on the yoke, between the limbs of the former a lever 38, manually operable from the side of the seat, is pivotably mounted on one end of a regulating rod 36 which runs through the limbs of the bracket. The regulating rod is displaceably mounted in the holes of the bearing bracket 39 and is locked axially by means of the lever 38 provides a clamping effect between the yoke 33 and the regulating rod 36. The other end of the regulating rod 36 is pivotably connected to a support 35 which is pivotably mounted on the tubular shaft 23. A lever 40, attached to the tubular shaft 23, is arranged to engage between two limbs of the support 35. Between the sides of the limbs and the lever 40 there is arranged a rubber bed 41 or the like, which elastically dampens relative movements between the lever 40 and the support 35. When individually adjusting the springing of the seat to a person sitting on it, the clamping action between the yoke 33 and the regulating rod 36 is eliminated by turning the lever to a neutral position. The support 35 then automatically assumes a position so that the lever 40 is situated halfway between the limbs of the support, and the lever can then be returned to the locking position. The regulating rod 36 can consequently limit the sprung movement of the seat 2 to the same maximum value, independent of the weight of the person sitting on the seat.

As is apparent from the above, the mechanisms described are directly or indirectly rigidly attached to the lower support frame 11 of the frame, and said support frame can be given an oscillating movement about an oscillation axis formed by the two pin bearings 12 situated on either side of the seat. Each pin bearing 12 comprises a rubber bushing (not shown) which almost without friction allows swinging movements of the support frame 11 in relation to the base frame 13. The oscillations in question result in relatively small movements in the pin bearings 12, and consequently the form of the rubber bushings in the pin bearings can be modified to a large degree in alternative embodiments. However, the rubber bushings are advantageously integrated with spaced fittings which are fastened to the support frame 11 and to the base frame 13, respectively, with the object of reliably preventing the seat being torn off in a collision or similar accident.

The pivoting axis for the support frame 11 and thereby for the swinging movement of the seat 2 is in the present example placed in a plane through a common center of gravity for the seat 2 and a person sitting on the seat. The result of this is that a damping element 50 between the support frame 11 and the base frame 13 can be formed with relatively small dimensions to dampen said swinging movements with a favourable spring characteristic.

In FIGS. 1, 2 and 3 a damping element 50 of the rubber spring type is shown. Said damping element 50 has a device for manual variation of the springing properties of the rubber spring. As is apparent from FIG. 3, the damping element 50 is pivotably mounted by means of a bearing 52 in a U-shaped bracket 51 fastened to the support frame 11. The damping element 50 comprises two element halves 53,54 facing each other, and U-shaped in cross section. These element halves are rotatably mounted relative to each other by means of the bearing 52. Relative rotations between the element halves 53,54 are provided by turning a knob 55 mounted at the front of the seat 2, the knob being attached by screw threads to one end of a shaft 56 going through the element halves 53,54. The knob 55 is so arranged that when turned it presses against the forward element half 53 at the same time as a fixed stop 57 on the rear end of the shaft is pressed against the rear element half 54.

Between the element halves 53,54 and transverse to said shaft 56 there is arranged an arm 59 pivotably mounted in the base frame 13, and having an I-shaped cross section in the area between the element halves 53,54. The arm 59 is formed with an opening through which the shaft 56 runs. About said opening and with guidance on the shaft 56 there is a rubber block 60 between the web of the arm 56 and the respective element halve 53,54. Said rubber blocks 60 take up in shear relative movements between the element halves 53,54 and the arm 59 caused by the oscillations of the support frame 11 about the pin bearings 12. The springing properties of the rubber blocks 60 are affected by different settings of the knob 55, whereby the blocks 60 can be caused to work under greater or less compressive load.

The arm 59 is by means of a bearing pivotably supported in a bearing bracket 63 attached to the base frame 13, and adjustment of the arm 59 in a vertical direction is regulated by a lever means 62 within a limited angular range. Manual regulation of the lever means 62 results in that both the arm 59 and the damping element 50 alter their height relative to the base frame 13, and the regulation is also taken to the support frame 11 via the bearing 52. The support frame 11 is hereby pivoted about the pin bearings 12 and thus causes an alteration in the slope of the seat. After adjustment to the desired slope, the position of the arm 59 is once again locked relative to the baseframe 13 by means of the lever means 62. This is a known construction and is therefore not described further.

In the embodiment according to FIG. 4 the arrangement according to the invention is designed as an accessory to vehicle seats, thereby enabling the arrangement according to the invention to be used on vehicle seat already existing.

The exemplified vehicle seat 72 comprises a frame 71 which for vertical springing has a conventional scissors arrangement between the seating portion of the seat and a base plate 81. The base plate 81 is usually provided with two longitudinal rails, one on either side, which are displaceably arranged for horizontal adjustment in coacting rails fixed to the floor of the vehicle. In the accessory according to the invention, there is attached to the bottom plate 81 along either side of the seat a bearing bracket 82 and a damping element 84. Each bracket 82 is via a cylindrical rubber bushing (not shown) and a bearing 83 pivotably mounted on a longitudinal supporting rail 85 on either side, said rails being conventionally displaceably mounted in rails 87 fixed to the floor of the vehicle. The rails 85,87 are locked relative to each other by a locking means 89 known per se, which is not described further. By manual operation of a forward lever in the locking means 89, the seat 72 can be given different settings in a longitudinal direction.

The damping element 84 is made as a shear spring and comprises two opposing transverse U-sections, of which one accommodates the other. Between the respective flanges of the U-sections there are fixed rubber sections 86 for taking up relative movements between said flanges and thus swinging movements of the seat. One U-section is attached to the bottom plate 81 and the other is attached to the rail 85.

The arrangement according to the invention has the same function, independent of whether it is integrated in a seat frame or whether it is made as an accessory. In both cases, it is presumed that disturbing forces with horizontal force components are transferred from the vehicle chassis to the seat 2,72 via the bearings 12,83. In consequence hereof, the seat will begin a pivoting movement relative to the vehicle chassis about the pivoting axis formed by the mountings. By the presence of rubber bushings in the mountings, the oscillations can be transferred without having to overcome inertia-creating friction forces in mountings and the like. The oscillations are dampened by means of the damping elements 50,84, which give the seat a relatively soft damping function. The curtseying movements of the seat 2,72 cause the back portion of the seat to move along horizontal arcs, these movements being experienced by a person sitting in the seat, from a comfort point of view, as a favourable yielding quality of the seat. By means of the arrangement according to the invention no disturbing forces are transferred from the back portion of the seat to a person in the seat.

The invention is not limited to the embodiments described above, since the invention can be modified in a plurality of different embodiments within the scope of the following patent claims. Thus, desired curtseying movements about a transverse axis can be provided by the supporting frame of the chair frame being pivotably connected to the base frame via two links, one on either side of the seat, allowing the seat oscillating movements about an imaginary axis situated below the base frame attached to the vehicle body.

The damping element can naturally comprise an optional number of individual spring elements, which can be placed not only in front of but even behind the axis for the curtseying movement of the seat. It is also conceivable to vary the placing of the elements between the oscillating seat and a portion fixed relative to the vehicle body, so that more than one location of the force transmitting connection between the support frame and the seat base on the vehicle body can be contemplated.

The statement that the base is to be rigidly connected to the vehicle body naturally allows for solutions where the base is locked in certain predetermined positions against movements relative to the vehicle body, so that desired adjustment of the seat position in different planes can be obtained.

What we claim is:

1. Apparatus for damping oscillating movements in vehicle seats comprising essentially a seat portion, a back support portion, a seat frame and a base frame, the seat frame being located between at least the seat portion and the base frame and comprising an arm assembly for supporting the seat portion and for allowing the seat portion to be positioned at different levels relative to the base frame depending on the load, said assembly including arms having lower ends pivotably supported in a support frame that constitutes the lower part of the seat frame and having upper ends connected to the seat portion, said assembly further including adjustable spring means cooperating with one of said arms for biasing said arms toward a seat supporting position, means for connecting the base frame to a vehicle floor, means pivotably supporting the support frame to the base frame so that the seat frame, the seat portion and the back support portion can oscillate about an essentially transverse axis, and at least one damping element cooperating with the support frame and with the base frame for damping such oscillations.

2. Apparatus as in claim 1 wherein the pivot axis of said means for pivotably supporting the support frame to the base frame is situated in a vertical plane coinciding with a common center of gravity for the seat and a person sitting on the seat during oscillating movement.

3. Apparatus as in claim 2 wherein said means for pivotably supporting the support frame to the base frame includes two pin bearings equipped with rubber bushings, one pin bearing on either side of the seat.

4. Apparatus as in claim 3 wherein the damping element comprises an arm pivotably mounted at one end to said base frame, a rubber block carried by said support frame, and means for adjustably compressing said rubber block around said arm at a location near its other end to thereby vary the damping characteristics of the damping element.

5. Apparatus as in claim 1 wherein said means connecting the base frame to a vehicle floor permits horizontal translation of the vehicle seat.

* * * * *